Figure 1:
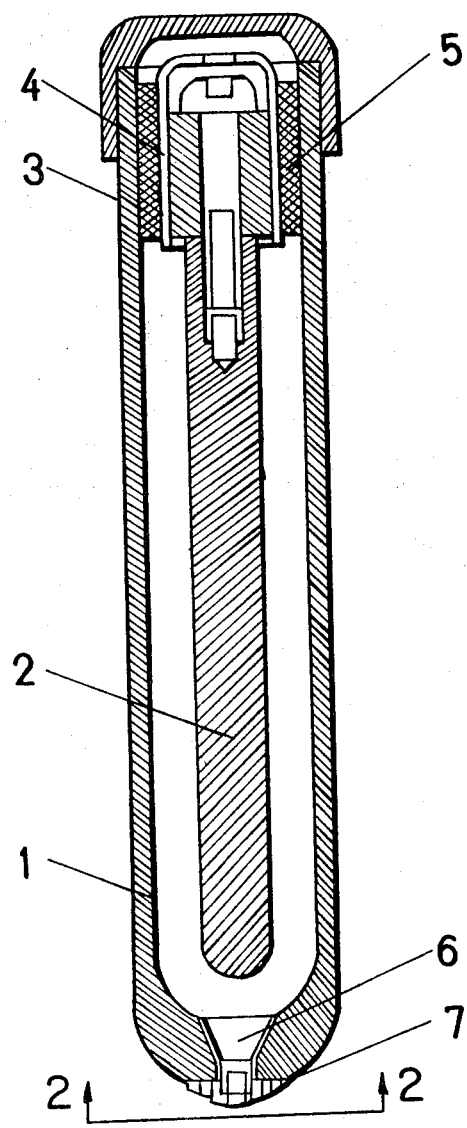

United States Patent
Zielczynski

[11] 3,719,826
[45] March 6, 1973

[54] PERSONNEL IONIZATION DOSIMETERS ESPECIALLY FOR RADIATION OF UNKNOWN COMPOSITION

[76] Inventor: Mieczyslaw Zielczynski, Nowotki 35 m 99, Warszawa, Poland

[22] Filed: May 14, 1969

[21] Appl. No.: 824,509

[30] Foreign Application Priority Data

Aug. 27, 1968 Poland ..................P. 128804

[52] U.S. Cl. ..........................................250/83.3 PD
[51] Int. Cl. ...............................................G01t 1/14
[58] Field of Search................................250/83.3 PD

[56] References Cited

UNITED STATES PATENTS

| | | | |
|---|---|---|---|
| 2,601,637 | 6/1952 | Rose et al. | 250/83.3 PD |
| 2,536,991 | 1/1951 | Wollan et al. | 250/83.3 PD |
| 2,639,389 | 5/1953 | Landsverk | 250/83.3 PD |
| 2,750,516 | 6/1956 | Ambrosen | 250/83.3 PD |
| 2,875,343 | 2/1959 | Birkhoff et al. | 250/83.3 PD X |
| 2,945,734 | 7/1960 | Landsverk et al. | 250/83.3 PD X |

OTHER PUBLICATIONS

Summary Report on the Development of Electrometer Radiation Instruments, by Landsverk et al., AECD–1865 Declassified April 13, 1948, pgs. 14 and 16.

*Primary Examiner*—Archie R. Borchelt
*Attorney*—Irvin A. Lavine

[57] ABSTRACT

A personal ionization dosimeter comprising a group of three individual dosimeters each including an annular voltage electrode defining a housing and a cylindrical test electrode therein, the ratio of the radius of the active surfaces of the electrodes not exceeding 2.5; an auxiliary electrode is provided and a supply capacitor is connected across the auxiliary and voltage electrodes. The dosimeters are filled with a mixture of propane (55 percent), carbon dioxide (41 percent) and nitrogen (4 percent) at a pressure of 28–85 lb/sq. in. One dosimeter has a voltage of 40 volts and the other two a voltage of 800 volts.

7 Claims, 2 Drawing Figures

PERSONNEL IONIZATION DOSIMETERS ESPECIALLY FOR RADIATION OF UNKNOWN COMPOSITION

The present invention relates to a personal ionization dosimeter designed to determine dose equivalent, especially when the individual carrying this dosimeter remains in the field of ionizing radiation with an intricate or unknown composition and spectrum.

Personal ionization dosimeters hitherto in use permit the exposure dose to be metered with a satisfactory degree of accuracy only in the gamma and X-ray radiation fields. Dosimeters of this type are calibrated in roentgen units. How-ever, there are also known personal ionization dosimeters calibrated in rad units. The walls of such dosimeters are generally built of a soft-tissue-equivalent material to determine the dose present herein.

Intensity of the electric field between electrodes of the heretofore-used ionization dosimeters has usually been spatially heterogeneous on account of a very small radius of the test electrode, and moreover the value of the field has varied in the process of dosimeter irradiation, but is nevertheless at all times high enough to ensure in practice 100 percent accumulation of ions.

In these circumstances, the dosimeter indications do not take account of the linear density of particle ionization. This entails difficulty in calibrating the dosimeter in dose equivalent units i.e. in rems.

Dosimeter indications in roentgens or rads may be regarded as a sufficient measure of radiation danger only in those cases where the composition and approximate energy spectrum of the radiation are known. According to radiation type, one and the same dosimeter indications may correspond to dose equivalents differing only an order of magnitude between one another. Hence, using the heretofore-applied personal ionization dosimeters to sense radiations of an unknown composition and spectrum, the dose equivalent could have been determined with an accuracy of an order of magnitude only.

The object of this invention is to enable the measurement of dose equivalent by means of a personal dosimeter in a field of radiation having an unknown composition and spectrum. The technical task set to achieve this object relies on engineering such a personal dosimeter which, apart from the absorbed dose might also take account of the linear density of particle ionization.

This object has been achieved by providing for the area contained between the voltage electrode, constituting simultaneously a housing of the dosimeter, and the test electrode, an electric field which is constant in time and space and creating favorable conditions for the column recombination of ions in a higher-pressure gaseous atmosphere present in the inter-electrode space. To maintain spatial stability of the electric field, the ratio of the curvature radius of the voltage electrode surface to that of the test electrode is established so as not to exceed the value of 2.5. To ensure electric field stability in time, the supply capacitor is connected across the auxiliary and voltage electrodes thus rendering possible meter readings based on the measurement of voltage between the test electrode and the auxiliary electrode.

The dosimeter is fitted with a regulating element for controlling the pressure of gas fed to the inter-electrode space of the dosimeter, it is preferable to use a gas mixture of propane, carbon dioxide and nitrogen at a pressure of 28–85 lb./sq. in.

To enable a 100 percent assessment of dose equivalent, apart from the personal dosimeter according to this invention there is also necessary to use a detector for sensing the absorbed dose. It is possible to employ in the capacity of such a detector any type of an individual dosimeter calibrated in rads or also the dosimeter according to this invention but operated at a higher supply voltage to ensure complete accumulation of ions.

Figure 2:
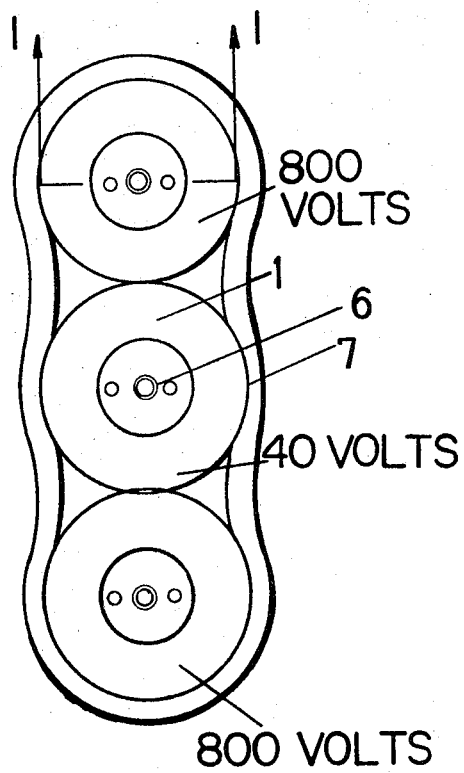

An exemplary embodiment of this invention is shown in the ac-companying drawing, wherein FIG. 1 shows a longitudinal cross-section of the dosimeter taken on the line 1—1 of FIG. 2, and FIG. 2 shows a bottom view of a pack of three dosimeters taken on the line 2—2 of FIG. 1.

The annular housing 1 of the dosimeter, preferably fabricated by the pressing technique, is of a current-conducting soft-tissue-equivalent material, and also has the function of a voltage electrode. The cylindrical test electrode 2 is in its diameter hardly 2.3 times smaller than the internal diameter of the voltage electrode. This ensures a sufficient uniformity of the electric field in the inter-electrode space. A sufficient stability of the electric field in time is produced by connecting the supply capacitor 3 across the voltage electrode 1 and auxiliary electrode 4, whereby dosimeter indications are read by taking measurement of the voltage between the test electrode 2 and the auxiliary electrode 4. A teflon insulator 5 gives the required tightness, and the pressure valve 6 made in the form of a tapered screw clamped from inside by the pressure of gas and from outside by a shaped bakelite nut 7, allows the dosimeter to be filled with a mixture of propane 55 percent, carbone dioxide 41 percent and nitrogen 4 percent to arrive at a pressure of 49.8 lb./sq. in.

The central dosimeter of the pack is charged to 40 volts whereas the two extreme ones are charged to 800 volts. The difference of arithmetical means of indications of both extreme dosimeters and the indication of the central dosimeter multiplied by calibration factor, taking account of the non-identity of dosimeter manufacture, is the measure of the dose equivalent. Two dosimeters operating at 800 volts are incorporated to reduce any possible measuring error resulting from the spatial non-uniformity of the radiation dose. This personal ionization dosimeter according to the invention permits the individual carrying said dosimeter to find out immediately what is his instantaneous exposure to radiation threat independently of the kind and spectrum of the ionizing radiation which at the given location. Sensitivity of this dosimeter is estimated at 300 mrems, whereas accuracy of determination of the dose equivalent in the penetrating radiation field of an unknown composition ranges at ± 30 percent. No such capabilities have been provided hitherto by any of the known personal ionization dosimeters.

It is advisable to use this type of personal dosimeter for personnel employed at accelerators, reactors, and thermonuclear installations, as well as for the crew and passengers of space ships, and for use in impersonal dosimetry when determining dose equivalent in places difficult of access.

What we claim is:

1. A personal ionization dosimeter for determining dose equivalent in a field of mixed penetrating radiation of unknown composition, comprising:

three dosimeters each of which comprises a voltage electrode and a test electrode of tissue-equivalent material, said voltage electrode defining a housing and said test electrode being within said voltage electrode and spaced therefrom, a gaseous atmosphere within said housing under super-atmospheric pressure, one said dosimeter having a relatively low voltage and the other two dosimeters having higher voltages.

2. The dosimeter of claim 1, wherein said voltage electrodes are each annular and said test electrodes are each cylindrical, and the ratio of the radius of the surface of said voltage electrode to the radius of the surface of said test electrode does not exceed 2.5.

3. The dosimeter of claim 2, and an auxiliary electrode in said housing, and a supply capacitor connected across said auxiliary and voltage electrodes.

4. The dosimeter of claim 3, said gaseous atmosphere having a pressure of approximately 50 lbs./sq. in., said low voltage being approximately 40 volts and said higher voltages being approximately 800 volts.

5. The dosimeter of claim 1, said gaseous atmosphere being a mixture of propane, carbon dioxide and nitrogen.

6. The dosimeter of claim 1, said gaseous atmosphere being a mixture of approximately 55 percent propane, 41 percent carbon dioxide and 4 percent nitrogen.

7. The dosimeter of claim 6, said gaseous atmospheres having a pressure of approximately 50 lbs./sq. in., said low voltage being approximately 40 volts and said higher voltages being approximately 800 volts.

* * * * *